United States Patent Office 2,935,924
Patented May 10, 1960

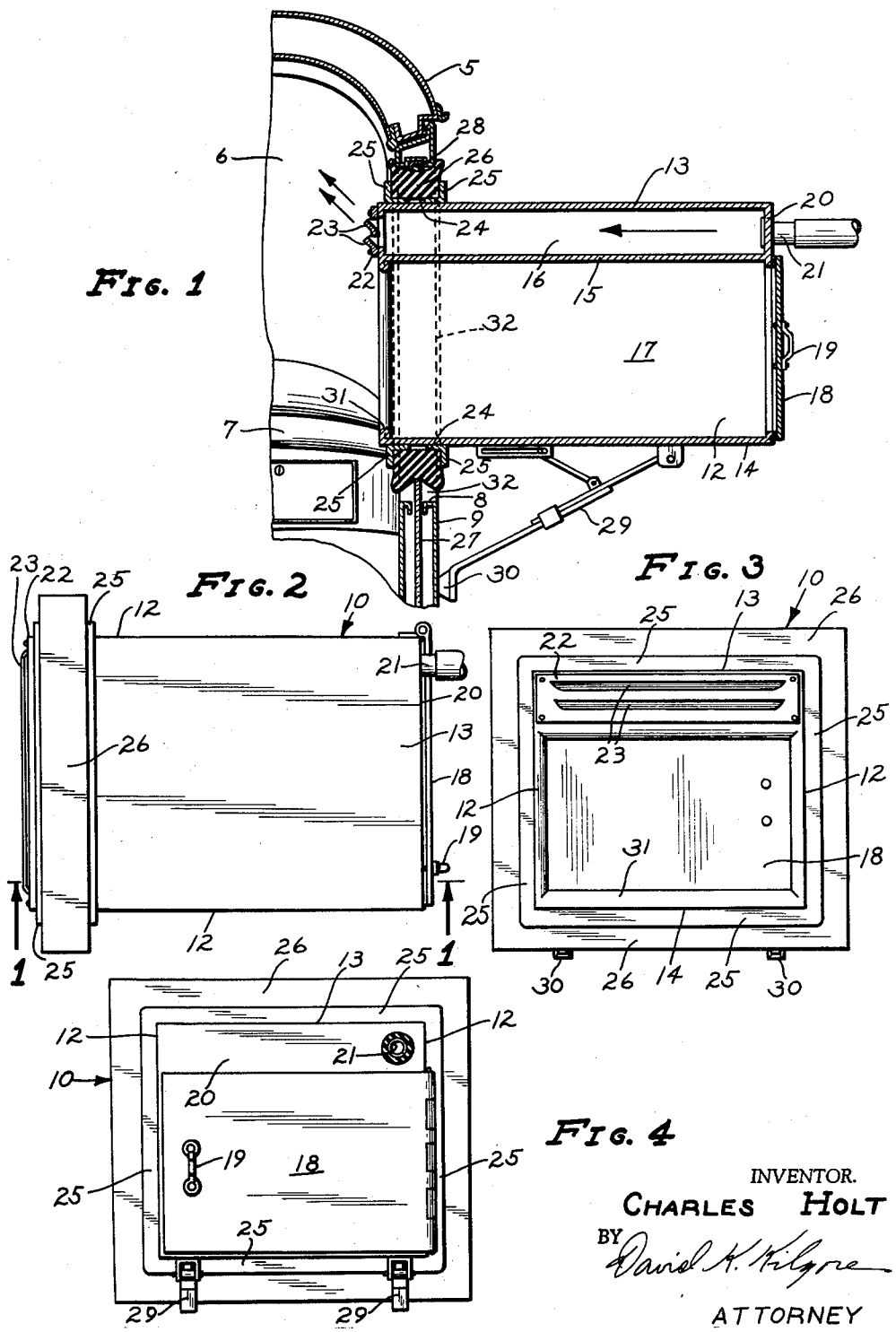

2,935,924

SERVICE AND VENTILATING UNIT FOR THE WINDOW OPENINGS OF VEHICLES

Charles A. Holt, Rochester, Minn.

Application November 6, 1958, Serial No. 772,262

1 Claim. (Cl. 98—2)

This invention relates broadly to ventilating systems for vehicles, and more particularly to an auxiliary ventilating unit detachably secured in the window opening of an immobile vehicle, and specifically to a ventilating unit of the type described wherein the same also affords service access to the interior of the vehicle for the serving of food and refreshments from outside said vehicle as in drive-in restaurants, theaters, and the like.

The principal object of the invention is to provide a combined ventilating system and service opening for the window opening of vehicles to afford means for air conditioning the vehicle interior, and permit the service of refreshments from the exterior of the vehicle.

The principal object of the invention is to provide a combined ventilating system having a food and refreshment service opening, the entire unit being insertable and removable from the window opening of a vehicle.

Another object of this invention is to provide a combined ventilating and service unit for the window openings of vehicles whereby each unit is independently, and detachably secured to a vehicle and connected to a central air conditioning unit for both summer and winter use in drive-in restaurants, theaters, and the like.

A further object of this invention is to provide a combined ventilating and food service unit insertable and removable from the window openings of vehicles whereby the said window opening is sealed off from normal atmosphere to afford air conditioning and insect proof service to the interior of said vehicle without the use of said vehicles heating or air conditioning apparatus.

A further object of this invention is to provide a combined ventilating and food service unit for the window openings of vehicles wherein said unit is connected to a central air conditioning apparatus by means of flexible connections.

A still further object of this invention is to provide a combined ventilating and food service unit wherein the basic unit is adaptable to window openings of all sizes.

These and other objects of the invention will become apparent from the following specification and claim taken in conjunction with the appended drawings which form a part of this application and in which, like characters indicate like parts throughout the several views.

To the above end, generally stated, the invention consists of the novel devices and combination of devices hereinafter described, and defined in the claim.

Referring to the drawing:

Fig. 1 is an elevational sectional view of the invention mounted in the right front window opening of a vehicle fragmentarily shown, taken on the line 1—1 of Fig. 2.

Fig. 2 is a top plan view showing the basic unit detached from its mounting station in a window opening of a vehicle, Fig. 3 is an inner end elevational view of the same, and Fig. 4 is a view similar to Fig. 3 but showing the outer end elevation of the basic unit.

Of the pertinent parts of a vehicle as shown, having window openings closed by conventional window closures, it is, for the purpose of this invention, important to note; the top 5, the windshield 6, the cowling and dashboard 7, and the window frame 8 of the door 9.

The numeral 10 is directed to the instant invention as an entirety and comprises a rectangular metal casing 11, said casing being closed at its side 12, top 13, and bottom 14 portions and having a transversely disposed internal intermediate divider plate 15 formed integral with the casing 11 adjacent its top portion 13, said combined member and the side portions 12 affording a passageway 16 between atmosphere and the interior of the vehicle. A relatively large rectangular, food service chamber 17 is formed by the intermediate divider plate 15, the sides 12 and the bottom 14 of the casing 11. A hinged door 18 normally closes the outer end portion of the service chamber 17 and is provided with a conventional handle 19. The outer end portion of the air passageway 16 is tightly closed to atmosphere by an end plate 20 having in one end portion thereof an outstanding conventional tubular fitting 21 to receive the discharge end of an insulated flexible hose leading from the air conditioning unit, not shown. The inner end portion or discharge port of the air passageway 16 is provided with a pair of directional baffles 23 to direct the air stream passing therethrough upwardly and away from an occupant in the vehicle adjacent said discharge port. The inner end portion of the service chamber 17 is open thus affording easy access thereto by occupants of the vehicle.

A seat 24 having outstanding flanges 25 extends around the inner end portion of the core 11 and affords a mounting station for a resilient collar 26 that is preferably formed of sponge rubber or its equivalent.

It will be well to consider at this point, that the unit 10 is positioned in the window opening of a vehicle by lowering the window glass closure 27 sufficiently to place the lower edge of the resilient collar 26, substantially at its transverse center, on the window glass closure. The glass closure 27 is then cranked upwardly towards its closed position until the upper edge portion of the resilient collar 26 is in compressed engagement with the window channel 28 at the upper end portion of the window opening. A pair of endwise adjustable supporting arms 29 are pivotally attached to the lower longitudinal edge portions of the core 11 and are provided at their outer end portions with rubber clad feet 30. These supporting arms 29 independently engage the outer surfaces of the car door panel beneath the window opening and afford means to rigidly support the outwardly projecting portions of the core 11 and also serve to level the unit relative to the ground.

It is important to note that the inner edge portion 31 of the bottom member 14 of the service chamber 17 is materially upturned to afford a stop for a tray of food or the like placed thereon and to prevent any inadvertent spillage from running into the interior of the vehicle.

It has been explained herein how the unit 10 is held positioned in a window opening by engagement of the resilient upper and lower edges of the collar 26 with the window 27 and the upper window channel 28 when the vehicle window is raised to compress the resilient collar. Obviously a unit of standard height can be used in view of this wide range of vertical adjustment. It will be necessary, however, to afford a complete lateral adjustment, to provide units of several widths with minor compensation met by the compressibility of the resilient collar 26 having engagement with the side channels 32 of the window frame 8. Presently this arrangement will be followed in producing the unit commercially. It will be understood, however, that it is possible for anyone skilled in the art to produce means for lateral endwise adjustment of the resilient collar 26 and its mounting means whereby such lateral adjustments can be made to increase the width of the unit to universally fit all standard window openings with a unit of standard size. Such single adjustable means being lacking in inventive concept are not thought to be an important factor insofar as this application is concerned.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claim as are stated herein or required by the prior art.

What I claim is:

A food, beverage, and ventilating unit detachably secured and supported in the window opening of a parked vehicle comprising in combination a rectangular casing substantially of said window opening dimension, said casing having a service chamber and a forced air passageway longitudinally disposed, the latter above the former, said service chamber connecting the interior of the vehicle to atmosphere and the air passageway connecting the interior of the vehicle to an independent, conditioned, forced air supply, a door hingedly mounted on the exterior of the casing to normally close the service chamber to atmosphere, said air passageway at its inner end portion being normally open to afford an unrestricted air passageway, a resilient compressible collar of sponge rubber or its equivalent circumferentially surrounding the casing adjacent its inner end portion to form a seal between the interior of the vehicle and atmosphere by compressing the resilient collar between the sides of the window opening of the vehicle, the adjustable window of said vehicle and the upper edge portion of the said window opening, secondary supporting means pivotally connected to the underside of the casing at the outer end portion thereof and having abutting engagement with the body of the vehicle at the free end portion thereof, said secondary supporting means being in the form of at least one extensible leg one end portion of which is secured pivotally to the casing and the other end portion thereof in frictional abutting engagement with the body of the vehicle when the unit is installed in the window opening of a vehicle.

References Cited in the file of this patent

UNITED STATES PATENTS

| | | |
|---|---|---|
| 953,803 | Sellers | Apr. 5, 1910 |
| 2,612,830 | Kendrick | Oct. 7, 1952 |
| 2,614,478 | Herman | Oct. 21, 1952 |
| 2,631,912 | Pryor | Mar. 17, 1953 |